G. W. JOHNSON.
SCALE RACK.
APPLICATION FILED JAN. 22, 1912.
1,034,622.
Patented Aug. 6, 1912.
3 SHEETS—SHEET 2.
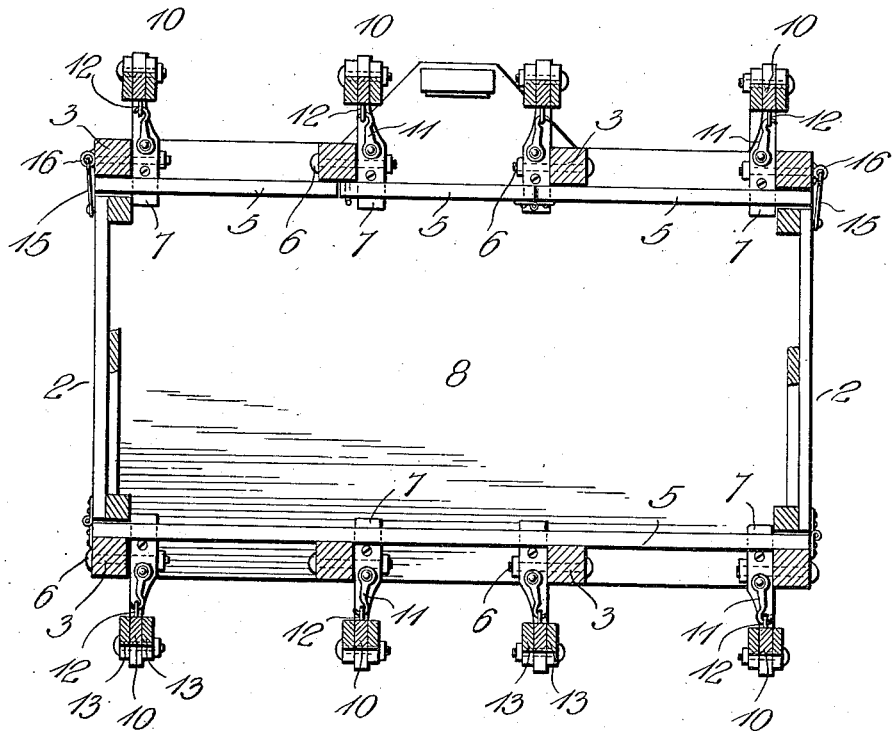
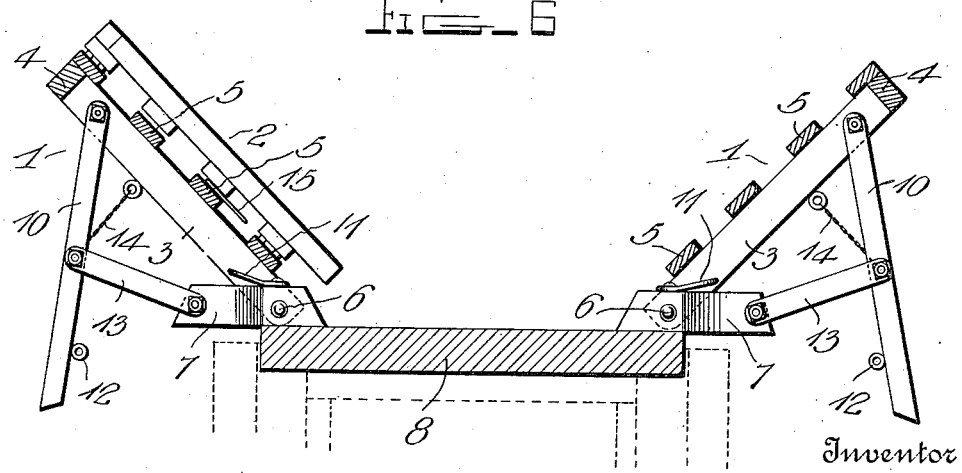
Witnesses
Inventor
George W. Johnson
by Attorneys G. W. JOHNSON.
SCALE RACK.
APPLICATION FILED JAN. 22, 1912.
1,034,622.
Patented Aug. 6, 1912.
3 SHEETS—SHEET 3.
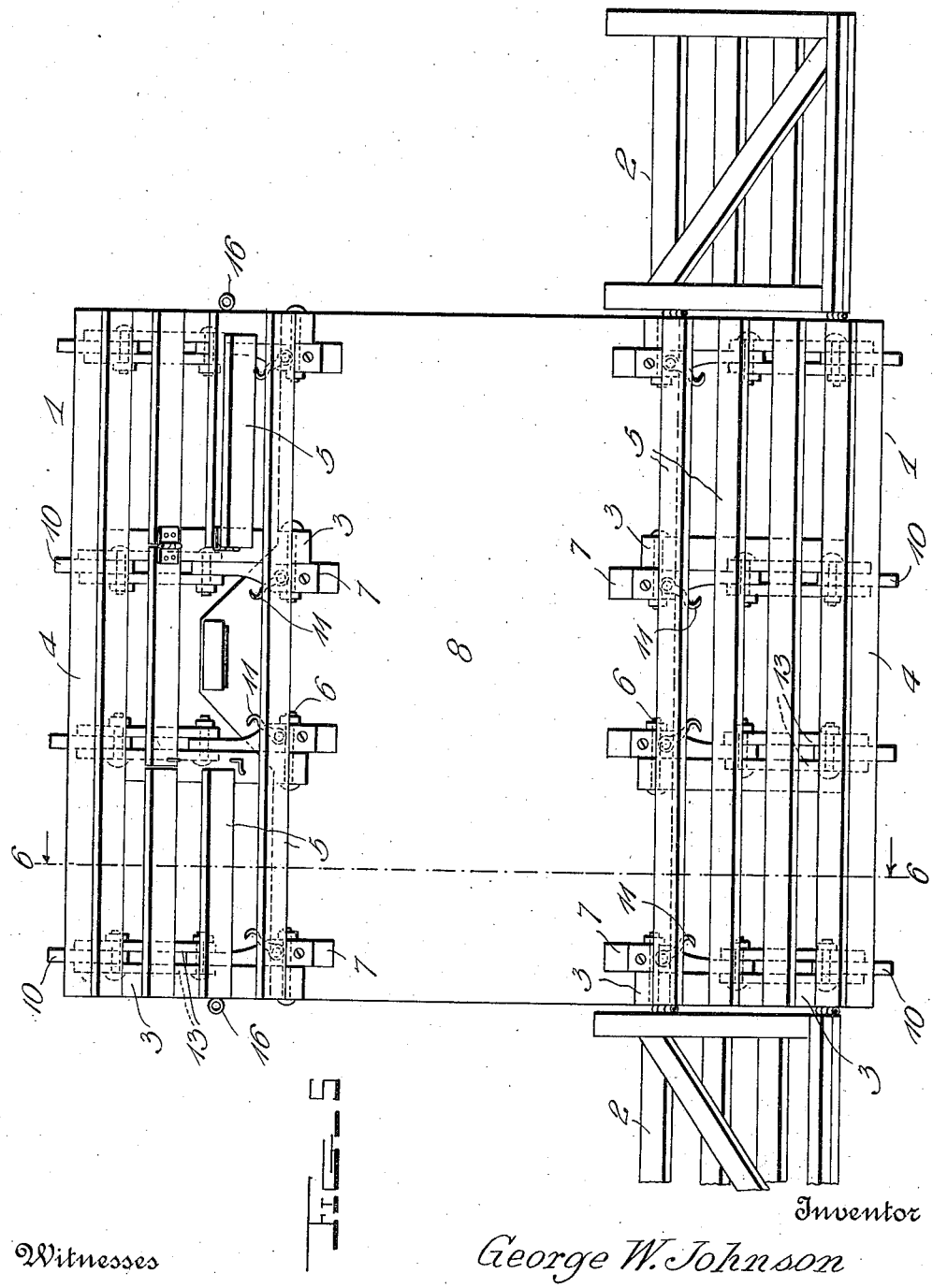
Witnesses
Inventor
George W. Johnson
by H. B. Willson & Co.
Attorneys

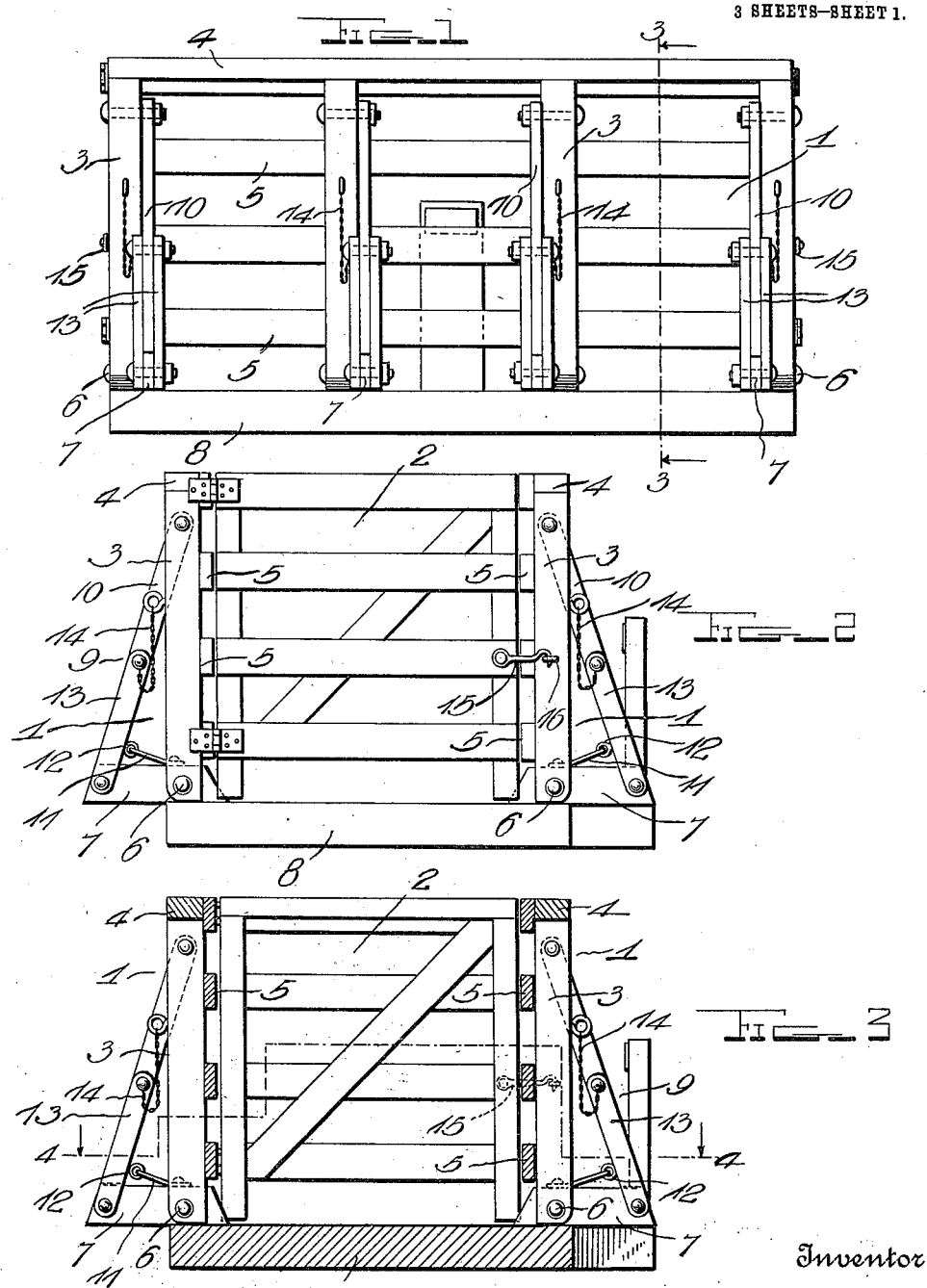

UNITED STATES PATENT OFFICE.

GEORGE W. JOHNSON, OF WAVELAND TOWNSHIP, POTTAWATTAMIE COUNTY, IOWA.

SCALE-RACK.

1,034,622. Specification of Letters Patent. Patented Aug. 6, 1912.

Application filed January 22, 1912. Serial No. 672,657.

*To all whom it may concern:*

Be it known that I, GEORGE W. JOHNSON, a citizen of the United States, residing at Waveland township, in the county of Pottawattamie and State of Iowa, have invented certain new and useful Improvements in Scale-Racks; and I do declare the following to be a full, clear, and exact description of the invention, such as will enable others skilled in the art to which it appertains to make and use the same.

This invention relates to improvements in scale racks.

One object of the invention is to provide a scale rack adapted to be secured to the platform of a scale for confining stock thereon while being weighed and which is provided with hinged sides and ends adapted to be swung outwardly to permit large loads of hay or the like to be driven onto the scales, thus obviating the necessity of removing the rack when such loads are to be weighed.

Another object is to provide a rack of this character which may be readily operated by one person.

With these and other objects in view the invention consists of certain novel features of construction, and the combination and arrangement of parts as will be more fully described and claimed.

In the accompanying drawings; Figure 1 is a side view of my improved rack showing the parts in closed and operative position; Fig. 2 is an end view with the parts as shown in Fig. 1; Fig. 3 is a vertical cross section of the same on line 3—3 of Fig. 1; Fig. 4 is a horizontal section on the line 4—4 of Fig. 3; Fig. 5 is a plan view showing the ends open and the sides swung back to permit a large load to be driven onto the scales; Fig. 6 is a cross section of the rack with the parts shown in open position as in Fig. 5 and taken on the line 6—6 of this figure.

My improved scale rack comprises sides 1, and ends 2. Each of the sides 1 consists of a series of vertically disposed posts or standards 3 spaced a suitable distance apart and connected at their upper ends by an upper cross bar 4 and on their inner sides by a series of longitudinally disposed slats 5 which are spaced apart and arranged sufficiently close together to confine stock on the platform of the scale when being weighed. The standards or posts 3 of the side members of the rack are pivotally or hingedly connected at their lower ends by bolts or similar fastening devices 6 to sills 7 which are bolted or otherwise firmly secured to the platform 8 of the scales and which project laterally a suitable distance beyond the side edges of the platform as shown. The side members are held in upright position to form the sides of the rack by inclined braces 9, said braces comprising bars 10, which are pivotally secured by bolts or the like to the standards or posts 3 near their upper ends. The bars 10 are of sufficient length and have their lower ends cut at a suitable angle for engaging the upper sides of the sills 7 as shown. The bars 10 are held in operative engagement with the sills to form the braces for the sides of the rack by means of hooks 11 which are arranged on the upper sides of the sills and are adapted to be engaged with eyes 12 arranged on the inner sides of the bars 10 near their lower ends as shown.

The bars 10 are pivotally connected to the sills 7 by pairs of links or connecting bars 13 which are pivotally secured at their lower ends to the opposite sides of the outer ends of the sills 7 and at their upper ends are pivotally connected to the upper sides of the bars 10 substantially midway between the ends of said bars whereby when the hooks 11 are disengaged from the eyes 12 in the lower ends of the latter, the bars 10 may be swung outwardly, thus disengaging their lower ends from the sills 7 and permitting the side members to be rocked or swung outwardly to the positions shown in Figs. 5 and 6 of the drawings. In order to limit the outward movement of the levers 10 and links or bars 13 and thereby limit the outward movement of the side members 1, I provide short stop chains 14 one of the ends of which is secured to the outer sides of the standards or posts 3 and the other ends to the pivot bolts connecting the links 13 with the bars 10. In the side member 1 adjacent to the box of the scale, one or more of the intermediate slats 5 of said side are formed in a plurality of sections, the sections between the inner standards or posts 3 or opposite to the scale box being preferably hinged at one end and detachably secured at the other end to permit said sections to be swung inwardly when the side member is lowered or swung outwardly thus preventing the box from interfering with the opening movement of the side.

The ends 2 of the rack are in the form of slatted gates hinged at one edge to the end post of one side of the rack and having on their opposite ends hooks 15 which are adapted to be engaged with eyes or keepers 16 arranged in the ends of the opposite side whereby said end members or gates are securely fastened in closed position when the sides of the rack are elevated or in position for use. The fastening hooks 15 of the gates or end members 2 also form an additional means for firmly holding the side members in closed or operative position.

By means of a rack constructed as herein shown and described it will be seen that when the parts are in operative position, stock driven into the same will be confined on the platform of the scale while being weighed and that when it is desired to use the scale for weighing large loads of hay or the like that it is simply necessary to open the end members or gates and to release and swing the side members back or outwardly thus obviating the necessity of removing the rack from the platform of the scales. It will also be seen that this operation may be readily performed by one person, whereas in the usual form of scale racks a number of persons are required to lift and remove the rack from the platform when large loads are to be weighed.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is;

1. A scale rack comprising sills, side members hingedly connected to said sills and adapted to be swung outwardly, braces pivotally connected at their upper ends to said side members and adapted to be engaged at their lower ends with said sills, means to fasten said braces in operative position to support the side members of the rack, links to pivotally connect said braces with the sills whereby when said fastening means are released the braces may be swung outwardly to permit the side members to be swung back to an open position, and end members connected to said side members.

2. A scale rack comprising a plurality of sills secured to the platform of the scales and projecting laterally therefrom, side members comprising a series of standards hingedly connected at their lower ends to said sills and adapted to be swung outwardly, slats secured to said standards to form the sides of the rack, a plurality of braces pivotally connected at their upper ends to said standards and adapted to be engaged at their lower ends with said sills, means to secure said braces in operative position to support the side members of the rack, links to pivotally connect said braces with said sills, end members comprising gates hingedly connected at one end to one of said side members, and means to fasten the opposite ends of said gates to the opposite side member.

3. A scale rack comprising a plurality of sills secured to the platform of the scales and projecting laterally therefrom, side members comprising a series of standards hingedly connected at their lower ends to said sills and adapted to be swung outwardly, slats secured to said standards to form the sides of the rack, a plurality of braces pivotally connected at their upper ends to said standards and adapted to be engaged at their lower ends with said sills, hooks arranged on said sills, eyes secured to the lower ends of said braces and adapted to receive said hooks whereby the braces are secured in operative position to support the sides of the rack, links pivotally connected to said sills and to said braces whereby when said brace fastening members are released the braces may be swung outwardly to permit the side members of the rack to be swung back to open position, stop chains secured to the side members and to said links, and braces whereby the outward movement of said parts is limited, end members comprising gates hingedly connected at one end to the ends of one of said side members, and fastening devices secured to the opposite ends of said gates and adapted to be engaged with the adjacent ends of the opposite side member whereby the gates are held in closed and operative position.

In testimony whereof I have hereunto set my hand in presence of two subscribing witnesses.

GEORGE W. JOHNSON.

Witnesses:
　THOMAS JULIAN BRYANT,
　W. C. BRYANT.

---

Copies of this patent may be obtained for five cents each, by addressing the "Commissioner of Patents, Washington, D. C."